(12) United States Patent
Jen et al.

(10) Patent No.: US 11,616,232 B2
(45) Date of Patent: Mar. 28, 2023

(54) DOPED LITHIUM MANGANESE IRON PHOSPHATE-BASED PARTICULATE, DOPED LITHIUM MANGANESE IRON PHOSPHATE-BASED POWDERY MATERIAL INCLUDING THE SAME, AND METHOD FOR PREPARING POWDERY MATERIAL

(71) Applicant: HCM CO., LTD., Taoyuan (TW)

(72) Inventors: Chien-Wen Jen, New Taipei (TW);
Hsin-Ta Huang, Taipei (TW);
Chih-Tsung Hsu, New Taipei (TW);
Yi-Hsuan Wang, New Taipei (TW)

(73) Assignee: HCM CO., LTD., Taoyuan (TW)

( * ) Notice: Subject to any disclaimer, the term of this patent is extended or adjusted under 35 U.S.C. 154(b) by 612 days.

(21) Appl. No.: 16/715,096

(22) Filed: Dec. 16, 2019

(65) Prior Publication Data

US 2021/0119211 A1    Apr. 22, 2021

(30) Foreign Application Priority Data

Oct. 16, 2019 (TW) ................................ 108137209
Oct. 16, 2019 (TW) ................................ 108137210

(51) Int. Cl.
*H01M 4/58* (2010.01)
*H01M 4/1397* (2010.01)
(Continued)

(52) U.S. Cl.
CPC ......... *H01M 4/5825* (2013.01); *B22F 3/1017* (2013.01); *B22F 9/04* (2013.01);
(Continued)

(58) Field of Classification Search
CPC ............... H01M 4/1397; H01M 4/366; H01M 4/5825
See application file for complete search history.

(56) References Cited

U.S. PATENT DOCUMENTS

2013/0140497 A1* 6/2013 Nuspl ............ C04B 35/447
252/507
2015/0123028 A1* 5/2015 Huang ............... C01B 25/26
252/182.1
(Continued)

FOREIGN PATENT DOCUMENTS

CN        102074690 A    5/2011
CN        102364726 A    2/2012
(Continued)

OTHER PUBLICATIONS

Search Report issued to European counterpart application No. 20150982.5 by the EPO dated Apr. 23, 2020 (9 pages).
Search Report appended to an Office Action, which was issued to Taiwanese counterpart application No. 108137210 by the TIPO dated May 15, 2020, and corresponding English translation (2 pages).
(Continued)

*Primary Examiner* — Ula C Ruddock
*Assistant Examiner* — Scott J Chmielecki
(74) *Attorney, Agent, or Firm* — Hamre, Schumann, Mueller & Larson, P.C.

(57) ABSTRACT

Disclosed is a doped lithium manganese iron phosphate-based particulate for a cathode of a lithium-ion battery. The particulate includes a composition represented by a formula of $M_m\text{-}Li_xMn_{1-y-z}Fe_yM'_z(PO_4)_n/C$, wherein M, M', x, y, z, m, and n are as defined herein. Also disclosed is a powdery material including the particulate, and a method for preparing the powdery material.

11 Claims, 7 Drawing Sheets

(51) Int. Cl.
    *C01B 25/45*     (2006.01)
    *H01M 4/36*     (2006.01)
    *H01M 4/587*     (2010.01)
    *H01M 10/0525*     (2010.01)
    *B22F 3/10*     (2006.01)
    *B22F 9/04*     (2006.01)
    *H01M 4/02*     (2006.01)

(52) U.S. Cl.
    CPC .......... *C01B 25/45* (2013.01); *H01M 4/1397* (2013.01); *H01M 4/364* (2013.01); *H01M 4/366* (2013.01); *H01M 4/587* (2013.01); *H01M 10/0525* (2013.01); *B22F 2009/041* (2013.01); *C01P 2002/74* (2013.01); *C01P 2006/12* (2013.01); *C01P 2006/40* (2013.01); *H01M 2004/021* (2013.01); *H01M 2004/028* (2013.01)

(56) References Cited

U.S. PATENT DOCUMENTS

2018/0040883 A1      2/2018    Khot et al.
2020/0295367 A1*    9/2020    Yoo ..................... H01M 4/505

FOREIGN PATENT DOCUMENTS

| | | |
|---|---|---|
| CN | 101777648 B | 8/2012 |
| CN | 102364726 B | 6/2013 |
| CN | 107359342 A | 11/2017 |

OTHER PUBLICATIONS

Search Report appended to an Office Action, which was issued to Chinese counterpart application No. 201911044096.0 by the CNIPA dated Sep. 24, 2021, with an English translation thereof (6 pages).

* cited by examiner

DOPED LITHIUM MANGANESE IRON PHOSPHATE-BASED PARTICULATE, DOPED LITHIUM MANGANESE IRON PHOSPHATE-BASED POWDERY MATERIAL INCLUDING THE SAME, AND METHOD FOR PREPARING POWDERY MATERIAL

CROSS-REFERENCE TO RELATED APPLICATION

This patent application claims priority of Taiwanese Patent Application Nos. 108137209 and 108137210, both of which were filed on Oct. 16, 2019.

FIELD

The disclosure relates to a doped lithium manganese iron phosphate-based particulate, and more particularly to a doped lithium manganese iron phosphate-based particulate for a cathode of a lithium-ion battery. The disclosure also relates to a doped lithium manganese iron phosphate-based powdery material including the particulate, and a method for preparing the powdery material.

BACKGROUND

Lithium-ion battery is commonly used as an energy saving device and a power supplying device for consumer electronic products, transportation facilities, etc. Conventional lithium manganese iron phosphate used as a cathode of the lithium-ion battery has inferior electric and lithium ion conductivities. Therefore, a carbon source is usually added in a process for preparing a lithium manganese iron phosphate-based cathode material so as to enhance the efficiency of the lithium-ion battery thus made (for example, to increase a discharge specific capacity at a large current). For example, Chinese Invention Patent Publication No. CN 102074690 A discloses a method for synthesizing a cathode material, in which an organic carbon source is added.

However, the lithium manganese iron phosphate-based cathode material synthesized by adding the carbon source has an increased carbon amount and an increased specific surface area. As such, severe side reactions might be induced by the cathode made from the lithium manganese ion phosphate-based cathode material and an electrolyte solution, for example, decomposition of an organic solvent and production of hydrogen fluoride (HF), which in turn leads to decrease of the cycle life and the thermal stability of the lithium-ion battery. In addition, the lithium manganese iron phosphate-based cathode material having an increased specific surface area is liable to absorb moisture, and thus is difficult to be dispersed, resulting in increased production cost for an electrode made therefrom.

SUMMARY

Therefore, a first object of the disclosure is to provide a doped lithium manganese iron phosphate-based particulate for a cathode of a lithium-ion battery to overcome the shortcomings described above.

A second object of the disclosure is to provide a doped lithium manganese iron phosphate-based powdery material, which includes the doped lithium manganese iron phosphate-based particulate, for a cathode of a lithium-ion battery.

A third object of the disclosure is to provide a method for preparing the doped lithium manganese iron phosphate-based powdery material.

According to a first aspect of the disclosure, there is provided a doped lithium manganese iron phosphate-based particulate for a cathode of a lithium-ion battery. The doped lithium manganese iron phosphate-based particulate includes a composition represented by Formula (1):

$$M_m\text{-}Li_xMn_{1-y-z}Fe_yM'_z(PO_4)_n/C \qquad (1)$$

wherein

M is selected from the group consisting of Mg, Ca, Sr, Al, Ti, Cr, Zn, W, and combinations thereof;

M' is selected from the group consisting of Mg, Ca, Sr, Al, Ti, Cr, Zn, W, and combinations thereof;

$0.9 \leq x \leq 1.2$;
$0.1 \leq y \leq 0.4$;
$0 \leq z \leq 0.1$;
$0.11 \leq y+z \leq 0.4$;
$0.85 \leq n \leq 1.15$;
$0.0005 \leq m \leq 0.1$;

m has a gradient decreasing from a surface of said particulate towards a center of said particulate; and C is in an amount of larger than 0 wt % and up to 3.0 wt % based on a total weight of a composition of $Li_xMn_{1-y-z}Fe_yM'_z(PO_4)_n/C$.

According to a second aspect of the disclosure, there is provided a doped lithium manganese iron phosphate-based powdery material for a cathode of a lithium-ion battery. The doped lithium manganese iron phosphate-based powdery material includes the doped lithium manganese iron phosphate-based particulate.

According to a third aspect of the disclosure, there is provided a method for preparing the doped lithium manganese iron phosphate-based powdery material. The method includes the steps of:

a) preparing a blend which includes a lithium source, a manganese source, an iron source, a phosphorous source, and a source of an additional metal selected from the group consisting of Mg, Ca, Sr, Al, Ti, Cr, Zn, W, and combinations thereof;

b) adding a carbon source to the blend to form a combination and subjecting the combination to milling and granulating to form a granulated combination;

c) subjecting the granulated combination to a preliminary sintering treatment to form a preform; and d) mixing the preform with a source of a dopant selected from the group consisting of Mg, Ca, Sr, Al, Ti, Cr, Zn, W, and combinations thereof to obtain a mixture, and subjecting the mixture to a further sintering treatment to form the doped lithium manganese iron phosphate-based powdery material.

BRIEF DESCRIPTION OF THE DRAWINGS

Other features and advantages of the disclosure will become apparent in the following detailed description of the embodiment with reference to the accompanying drawings, of which.

DETAILED DESCRIPTION

A doped lithium manganese iron phosphate-based particulate for a cathode of a lithium-ion battery according to the disclosure includes a composition represented by Formula (1):

$$M_m\text{-}Li_xMn_{1-y-z}Fe_yM'_z(PO_4)_n/C \qquad (1)$$

wherein

M is selected from the group consisting of Mg, Ca, Sr, Al, Ti, Cr, Zn, W, and combinations thereof;

M' is selected from the group consisting of Mg, Ca, Sr, Al, Ti, Cr, Zn, W, and combinations thereof;

$0.9 \leq x \leq 1.2$;
$0.1 \leq y \leq 0.4$;
$0 \leq z \leq 0.1$;
$0.11 \leq y+z \leq 0.4$;
$0.85 \leq n \leq 1.15$;
$0.0005 \leq m \leq 0.1$;

m has a gradient decreasing from a surface of said particulate towards a center of said particulate; and C (i.e., carbon) is in an amount of larger than 0 wt % and up to 3.0 wt % based on a total weight of a composition of $Li_xMn_{1-y-z}Fe_yM'_z(PO_4)_n/C$.

In certain embodiments, M is different from M' so as to be beneficial to the distribution of M in the doped lithium manganese iron phosphate-based particulate.

In certain embodiments, M is selected from the group consisting of Al, W, and a combination thereof.

In certain embodiments, M' is Mg.

In certain embodiments, m is in a range from 0.0005 to 0.05 (i.e., $0.0005 \leq m \leq 0.05$).

In certain embodiments, the doped lithium manganese iron phosphate-based particulate has a particulate size ranging from 0.5 μm to 20 μm.

A doped lithium manganese iron phosphate-based powdery material for a cathode of a lithium-ion battery according to the disclosure includes the doped lithium manganese iron phosphate-based particulate described above.

In certain embodiments, the doped lithium manganese iron phosphate-based powdery material has a specific surface area of smaller than 25.0 m²/g. In certain embodiments, the specific surface area is smaller than 20.0 m²/g.

A method for preparing the doped lithium manganese iron phosphate-based powdery material according to the disclosure includes the steps of:

a) preparing a blend which includes a lithium source, a manganese source, an iron source, a phosphorous source, and a source of an additional metal selected from the group consisting of Mg, Ca, Sr, Al, Ti, Cr, Zn, W, and combinations thereof;

b) adding a carbon source to the blend to form a combination and subjecting the combination to milling and granulating to form a granulated combination;

c) subjecting the granulated combination to a preliminary sintering treatment to form a preform; and d) mixing the preform with a source of a dopant selected from the group consisting of Mg, Ca, Sr, Al, Ti, Cr, Zn, W, and combinations thereof to obtain a mixture, and subjecting the mixture to a further sintering treatment to form the doped lithium manganese iron phosphate-based powdery material.

In certain embodiments, the dopant in step d) is different from the additional metal in step a) so as to be beneficial to the distribution of the dopant in the doped lithium manganese iron phosphate-based particulate.

In certain embodiments, the dopant in step d) is selected from the group consisting of Al, W, and a combination thereof.

In certain embodiments, the additional metal in step a) is Mg.

In certain embodiments, in step c), the preliminary sintering treatment is implemented at a temperature ranging from 400° C. to 850° C.

In certain embodiments, in step d), the further sintering treatment is implemented at a temperature ranging from 500° C. to 950° C.

In certain embodiments, the temperature for implementing the further sintering treatment is not lower than that for implementing the preliminary sintering treatment.

Examples of the disclosure will be described hereinafter. It is to be understood that these examples are exemplary and explanatory and should not be construed as a limitation to the disclosure.

Example 1: Preparation of a Powdery Material Including Doped Lithium Manganese Iron Phosphate-Based Particulates of $Al_{0.02}$—$Li_{1.02}Mn_{0.7}Fe_{0.25}Mg_{0.05}PO_4$/C ($P_{E1}$)

Manganese oxalate (a source of manganese (Mn)), iron oxalate (a source of iron (Fe)), magnesium oxide (a source of magnesium (Mg)), and phosphoric acid (a source of phosphorus (P)) in a molar ratio of Mn:Fe:Mg:P of 0.70: 0.25:0.05:1.00 were added sequentially into a reactor, and were stirred with water for 1.5 hours, followed by blending with lithium hydroxide (a source of lithium, a molar ratio of Li:P is 1.02:1.00) to obtain a blend. Thereafter, the blend was combined with glucose and citric acid (sources of carbon, a molar ratio of C:P is 0.09:1.00) to obtain a combination. The combination was grounded in a ball mill for 4 hours, and was then granulated and dried using a spray granulator to obtain a granulated combination. The granulated combination was subjected a preliminary sintering treatment under a nitrogen atmosphere at 450° C. for 2 hours and then at 650° C. for 2 hours to obtain a preform having a composition of $Li_{1.02}Mn_{0.7}Fe_{0.25}Mg_{0.05}PO_4/C$ (LMFP/C). An amount of carbon in the preform was 1.5 wt % based on a total weight of the preform.

The preform (LMFP/C) was mixed with aluminum oxide (a molar ratio of LMFP/C:Al is 1.00:0.02) to obtain a mixture. The mixture was subjected a further sintering treatment under a nitrogen atmosphere at 750° C. for 3 hours to obtain a target powdery material including doped lithium manganese iron phosphate-based particulates of $Al_{0.02}$—$Li_{1.02}Mn_{0.7}Fe_{0.25}Mg_{0.05}PO_4/C$.

Example 2: Preparation of a Powdery Material Including Doped Lithium Manganese Iron Phosphate-Based Particulates of $Al_{0.01}W_{0.01}$—$Li_{1.02}Mn_{0.7}Fe_{0.25}Mg_{0.05}PO_4/C$ ($P_{E2}$)

Procedures of Example 2 were similar to those of Example 1 except that in Example 2, the preform was mixed with aluminum oxide and tungsten trioxide in a molar ratio of (LMFP/C):Al:W of 1.00:0.01:0.01.

Comparative Example 1: Preparation of a Powdery Material Including Lithium Manganese Iron Phosphate-Based Particulates of $Li_{1.02}Mn_{0.7}Fe_{0.25}Mg_{0.05}PO_4/C$ ($P_{CE1}$)

Procedures of Comparative Example 1 were similar to those of Example 1 except that in Comparative Example 1, a molar ratio of C:P was 0.15:1.00, an amount of carbon in the preform (LMFP/C) was 2.5 wt % based on a total weight of the preform, and the preform was subjected to the further sintering treatment without mixing with aluminum oxide.

Comparative Example 2: Preparation of a Powdery Material Including Lithium Manganese Iron Phosphate-Based Particulates of $Li_{1.02}Mn_{0.7}Fe_{0.25}Mg_{0.05}PO_4/C$ ($P_{CE2}$)

Procedures of Comparative Example 2 were similar to those of Example 1 except that in Comparative Example 2, the preform (LMFP/C) was subjected to the further sintering treatment without mixing with aluminum oxide.

Comparative Example 3: Preparation of a Powdery Material Including Lithium Manganese Iron Phosphate-Based Particulates of $Li_{1.02}Mn_{0.685}Fe_{0.245}Mg_{0.07}PO_4/C$ ($P_{CE3}$)

Procedures of Comparative Example 3 were similar to those of Example 1 except that in Comparative Example 3, manganese oxalate, iron oxalate, magnesium oxide, and phosphoric acid in a molar ratio of Mn:Fe:Mg:P of 0.685:0.245:0.07:1.00 were added sequentially into the reactor, and the preform (LMFP/C) was subjected to the further sintering treatment without mixing with aluminum oxide.

Figure 1:
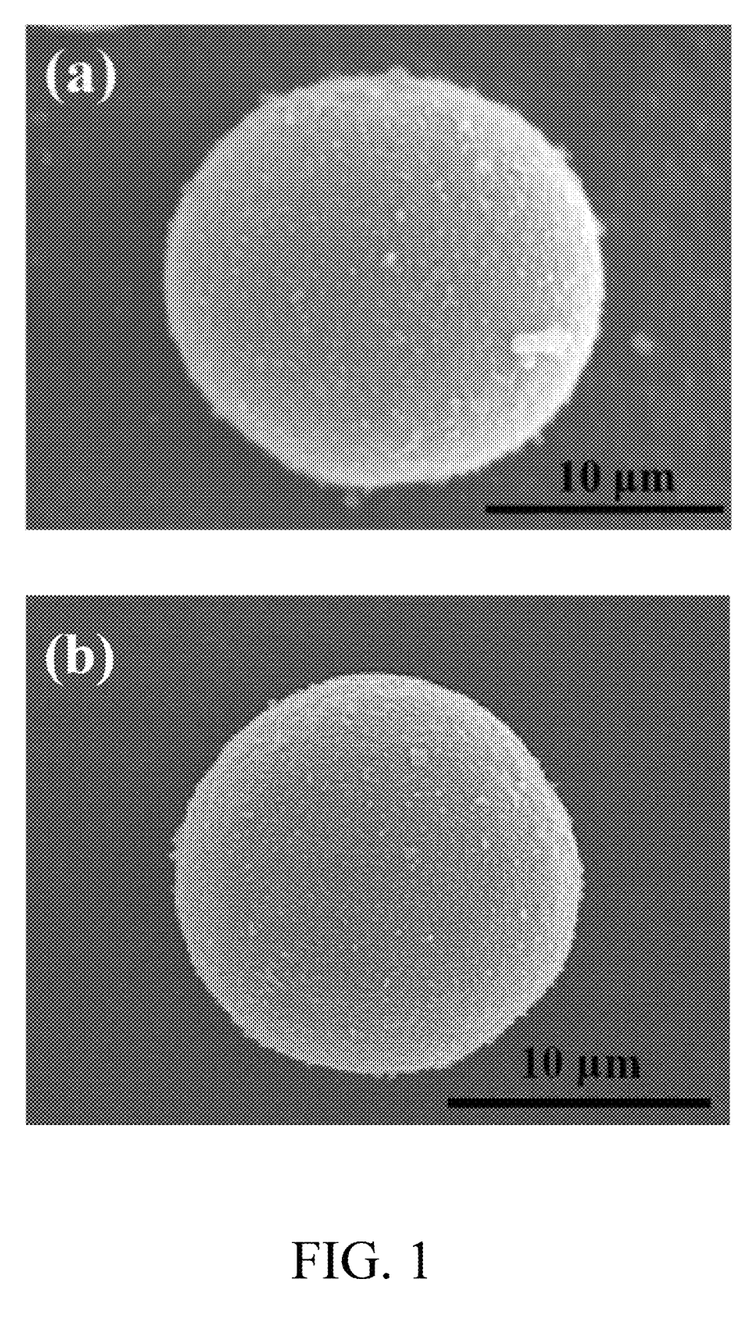
FIG. 1 illustrates scanning electron microscope (SEM) images of a doped lithium manganese iron phosphate-based particulate according to the disclosure, in which SEM images (a) and (b) show the doped lithium manganese iron phosphate-based particulates of Examples 1 and 2, respectively.

Scanning Electron Microscope Observation:

The doped lithium manganese iron phosphate-based particulates of Example 1 and 2 were observed using a scanning electron microscope, and images (a) and (b) as shown in FIG. 1 were obtained. As shown in images (a) and (b) of FIG. 1, the doped lithium manganese iron phosphate-based particulates of Example 1 and 2 have a particulate size of about 12 μm to 18 μm.

Figure 2:
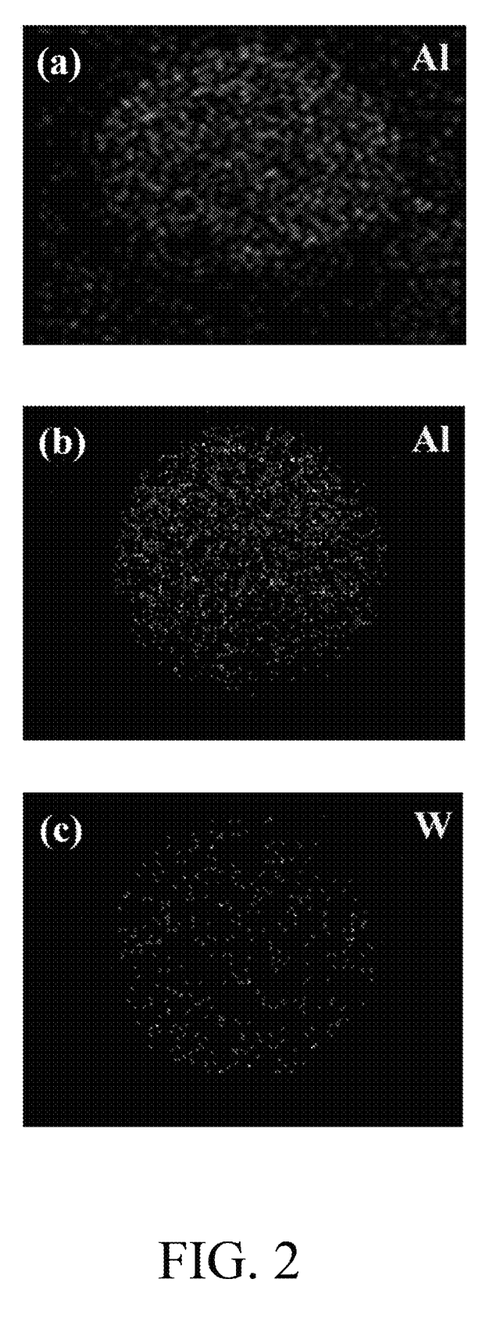
FIG. 2 illustrates images each showing distribution of a metal element on a surface of a doped lithium manganese iron phosphate-based particulate according to the disclosure, in which images (a) and (b) show the distribution of an aluminum element on the surfaces of the doped lithium manganese iron phosphate-based particulates of Examples 1 and 2, respectively, and image (c) shows the distribution of a tungsten element on the surface of the doped lithium manganese iron phosphate-based particulate of Example 2.

Element Distribution Analysis:

Distribution of an aluminum element on a surface of each of the doped lithium manganese iron phosphate-based particulates of Examples 1 and 2 was analyzed using an energy dispersive spectrometer in combination with a scanning electron microscope, and images (a) and (b) as shown in FIG. 2 were obtained. Distribution of a tungsten element on the surface of the doped lithium manganese iron phosphate-based particulate of Example 2 was also analyzed, and image (c) as shown in FIG. 2 was obtained.

As shown in image (a) of FIG. 2, the aluminum element is distributed substantially evenly on the surface of the doped lithium manganese iron phosphate-based particulate of Example 1. Similarly, as shown in images (b) and (c) of FIG. 2, the aluminum and tungsten elements are distributed substantially evenly on the surface of the doped lithium manganese iron phosphate-based particulate of Example 2.

The amounts of the aluminum element of the doped lithium manganese iron phosphate-based particulates of Examples 1 and 2 which were analyzed using inductively coupled plasma optical emission spectrometry (ICP-OES) were 2 mol % and 1 mol %, respectively. Similarly, the amount of the tungsten element of the doped lithium manganese iron phosphate-based particulate of Example 2 was 1 mol %.

Figure 3:
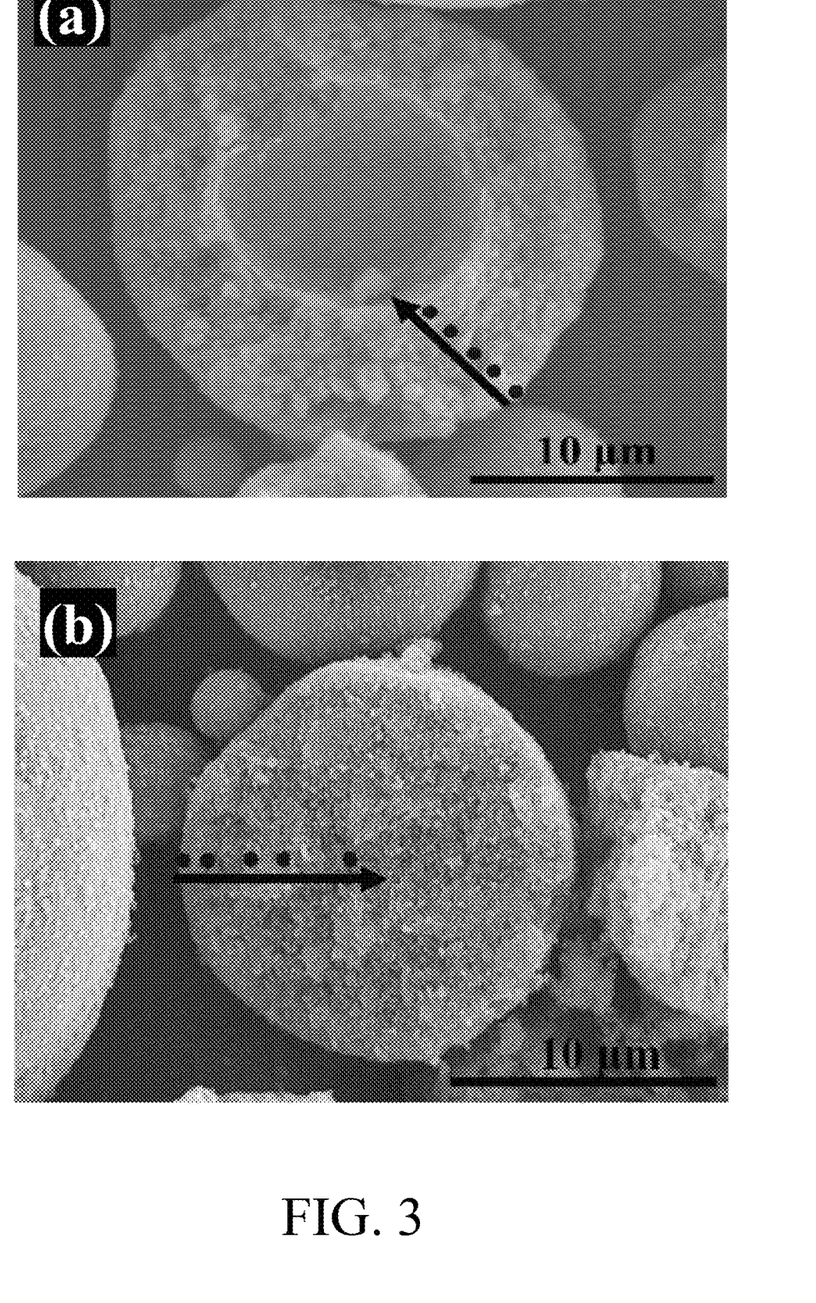
FIG. 3 illustrates enlarged SEM images of a doped lithium manganese iron phosphate-based particulate according to the disclosure, in which images (a) and (b) are the enlarged SEM images of the doped lithium manganese iron phosphate-based particulates of Examples 1 and 2, respectively.

The amounts of the aluminum element at various positions of the cross sections of the doped lithium manganese iron phosphate-based particulates of Examples 1 and 2, as shown with dots in images (a) and (b) of FIG. 3, were analyzed using an energy dispersive spectrometer in combination with a scanning electron microscope. The results are shown as graphs (a) and (b) in FIG. 4. Similarly, the amount of the tungsten element at various positions of the cross section of the doped lithium manganese iron phosphate-based particulate of Example 2, as shown with dots in image (b) of FIG. 3, was analyzed, and the result is shown as graph (c) in FIG. 4.

As shown in images (a) and (b) of FIG. 3, the doped lithium manganese iron phosphate-based particulates of Examples 1 and 2 has an integral structure, rather than a laminated structure.

Figure 4:
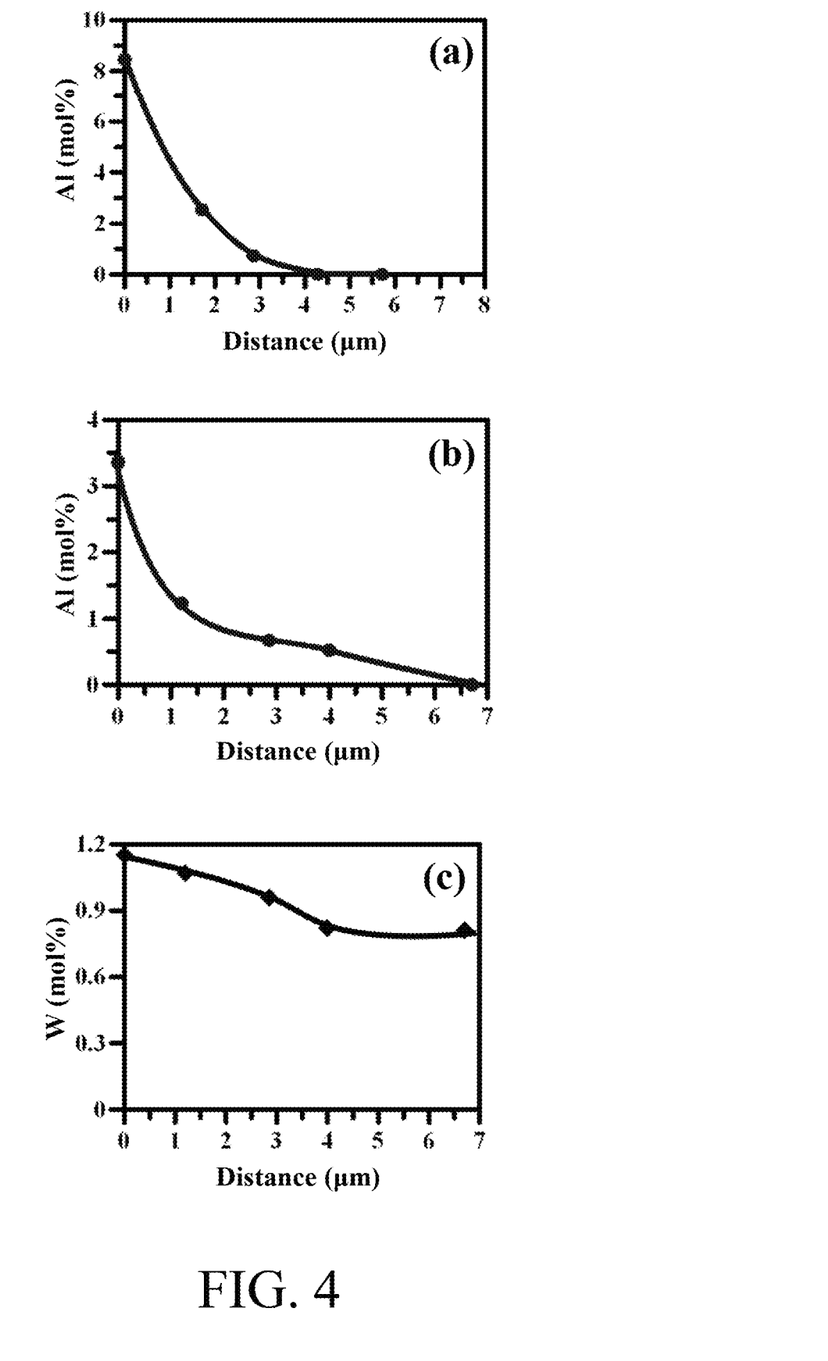
FIG. 4 illustrates graphs each showing a relationship between an amount of a metal element and a distance from a surface of a doped lithium manganese iron phosphate-based particulate according to the disclosure, in which graph (a) shows a relationship between an amount of an aluminum element and a distance from a surface of a doped lithium manganese iron phosphate-based particulate of Example 1, graph (b) shows a relationship between an amount of an aluminum element and a distance from a surface of a doped lithium manganese iron phosphate-based particulate of Example 2, and graph (c) shows a relationship between an amount of a tungsten element and a distance from a surface of a doped lithium manganese iron phosphate-based particulate of Example 2.

As shown in graph (a) of FIG. 4, the amount of the aluminum element of the doped lithium manganese iron phosphate-based particulate of Example 1 decreased in a continuous gradient from about 8.5 mol % to 0 mol % along a radial direction from a surface of the particulate towards a center of the particulate. Similarly, a shown in images (b) and (c) of FIG. 4, the amounts of the aluminum and tungsten elements of the doped lithium manganese iron phosphate-based particulate of Example 2 decreased in a continuous gradient from about 3.4 mol % to 0 mol % and from about 1.2 mol % to 0.8 mol %, respectively, along a radial direction from a surface of the particulate towards a center of the particulate.

Measurement of Specific Surface Area:

The specific surface area of each of the powdery materials of Examples 1 and 2 and Comparative Examples 1 to 3 was measured by Brunauer-Emmett-Teller (BET) method using a specific surface area analyzer. The results are shown in Table 1 below.

TABLE 1

| Powdery materials | Surface specific area (m²/g) |
|---|---|
| $P_{E1}$ | 15.4 |
| $P_{E2}$ | 14.8 |
| $P_{CE1}$ | 20.8 |
| $P_{CE2}$ | 13.4 |
| $P_{CE3}$ | 13.9 |

As shown in Table 1, the powdery material of Comparative Example 1 has a relatively large specific surface area, compared to those of Examples 1 and 2 and Comparative Examples 1 and 2, indicating that the powdery material of Comparative Example 1, in which the amount of carbon is relatively high, has a relatively large specific surface area, and thus a cathode manufactured therefrom may cause severe side reactions with an electrolyte solution.

Application Example 1

The powdery material of Example 1, carbon black, and polyvinylidene fluoride were blended at a weight ratio of 93:3:4 to obtain a blend. The blend was mixed with N-methyl-2-pyrrolidone to obtain a paste, which was applied using a doctor blade onto an aluminum foil having a thickness of 20 μm, followed by baking in vacuum at 120° C. to remove N-methyl-2-pyrrolidone, thereby obtaining a cathode material. The cathode material was pressed using a roller so as to have a thickness of 80 μm and then cut into a circular cathode having a diameter of 12 mm.

A lithium foil was used to make an anode with a diameter of 15 mm and a thickness of 0.2 mm.

Lithium hexafluorophosphate ($LiPF_6$, 1 M) was dissolved in a solvent system composed of ethylene carbonate, ethylmethyl carbonate, and dimethyl carbonate in a volume ratio of 1:1:1 to obtain an electrolyte solution.

A polypropylene membrane (purchased from Asahi Kasei Corp., a thickness of 25 μm) was cut into a circular separator with a diameter of 18 mm. The circular separator was immersed into the electrolyte solution and then removed therefrom to obtain an immersed separator.

The cathode, the anode, and the immersed separator thus prepared were used along with other components to manufacture a CR 2032 coin-type lithium-ion battery.

Application Example 2

The procedures of Application Example 2 were similar to those of Application Example 1 except that the powdery material of Example 2 was used to make a circular cathode in Application Example 2.

Comparative Application Example 1

The procedures of Comparative Application Example 1 were similar to those of Application Example 1 except that the powdery material of Comparative Example 1 was used to make a circular cathode in Comparative Application Example 1.

Comparative Application Example 2

The procedures of Comparative Application Example 2 were similar to those of Application Example 1 except that the powdery material of Comparative Example 2 was used to make a circular cathode in Comparative Application Example 2.

Comparative Application Example 3

The procedures of Comparative Application Example 3 were similar to those of Application Example 1 except that the powdery material of Comparative Example 3 was used to make a circular cathode in Comparative Application Example 3.

Charge/Discharge Capacity Measurement:

Charge/discharge specific capacity of each of the lithium-ion batteries of Application Examples 1 and 2 and Comparative Application Examples 1 to 3 was measured at 25° C. using a battery test device (commercially available from MACCOR, USA) at a current level of 1 C/0.1 C and at a voltage ranging from 2.7 V to 4.25 V. The results are shown in FIG. 5.

Figure 5:
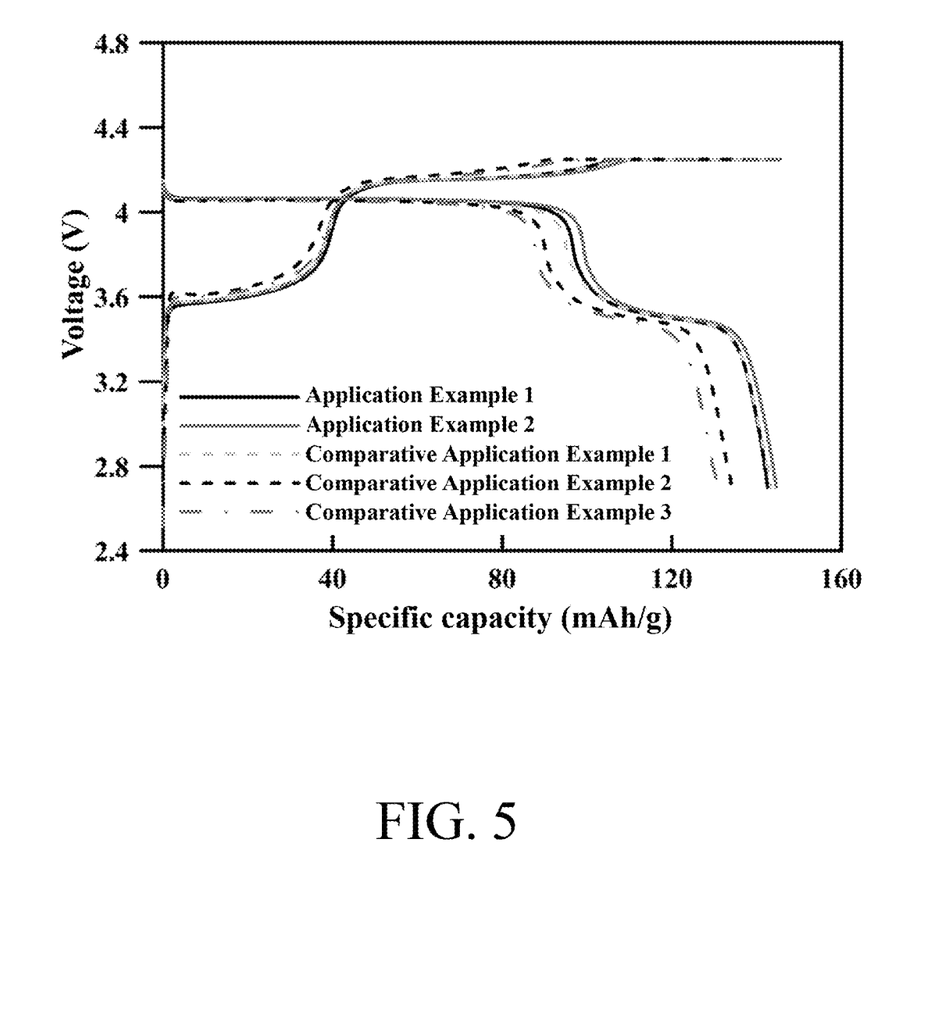
FIG. 5 is a graph illustrating charge/discharge specific capacity-voltage relationships of lithium-ion batteries of Application Examples 1 and 2 and Comparative Application Examples 1 to 3.

As shown in FIG. 5, the lithium-ion batteries of Application Examples 1 and 2 respectively have discharge specific capacities of 143.1 mAh/g and 145.3 mAh/g. The lithium-ion batteries of Comparative Application Examples 2 and 3 respectively have discharge specific capacities of 134.1 mAh/g, and 130.7 mAh/g, which are lower than those (143.1 mAh/g and 145.3 mAh/g) of the lithium-ion batteries of Application Examples 1 and 2. The lithium-ion battery of Comparative Application Example 1 has a discharge specific capacity of 143.3 mAh/g, which is substantially equal to that of the lithium-ion battery of Application Example 1. However, the lithium-ion battery of Comparative Application Example 1 is manufactured using the powdery material of Comparative Example 1, which has a relatively large specific surface area, and thus, severe side reactions may occur between the electrolyte solution and the cathode containing the powdery material, as described above.

Cycle Charge/Discharge Measurement:

Each of the lithium-ion batteries of Application Examples 1 and 2 and Comparative Application Examples 1 to 3 was measured at 25° C. using a battery test device (commercially available from MACCOR, USA) at currents of 1 C/0.1 C, 1 C/1 C, 1 C/5 C, and 1 C/10 C in sequence, and at a voltage ranging from 2.7 V to 4.25 V for 3 charge/discharge cycles for each of the currents. The results are shown in FIG. 6.

Figure 6:
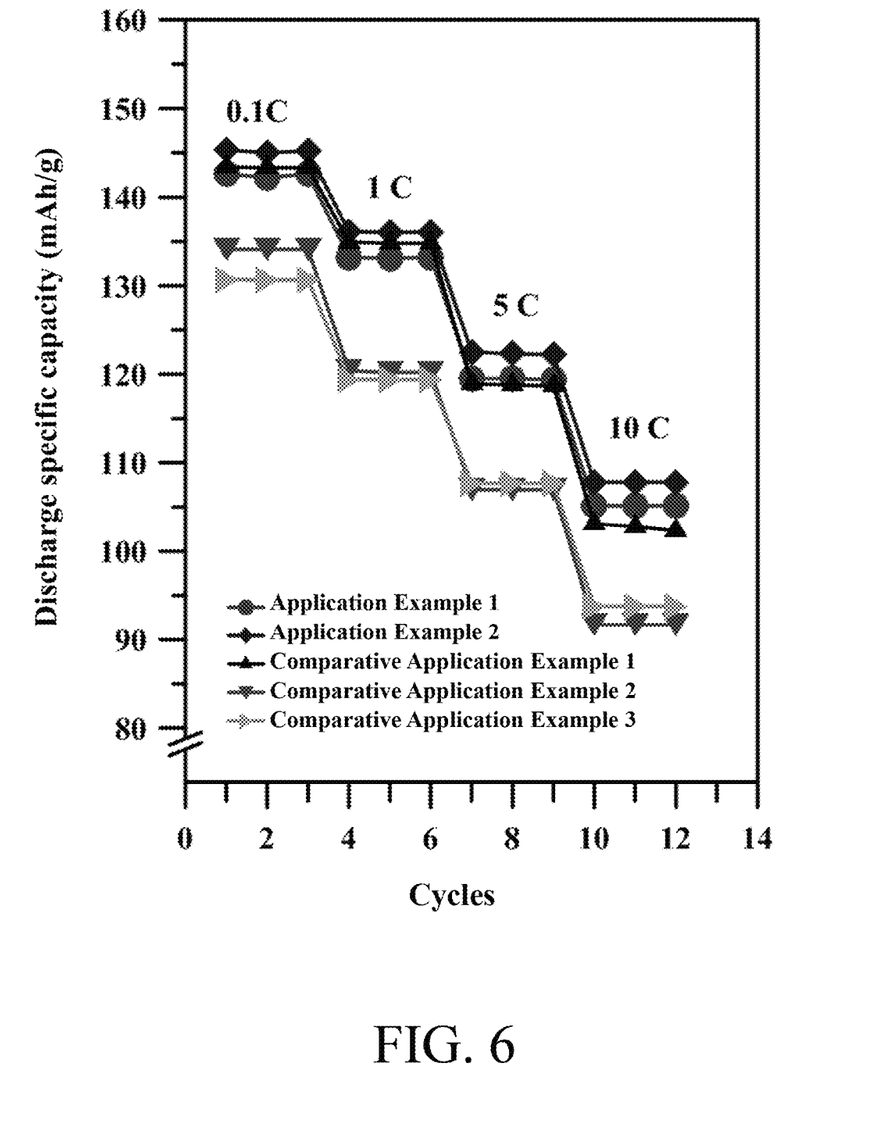
FIG. 6 is a graph illustrating cycle number-discharge specific capacity relationships of the lithium-ion batteries of Application Examples 1 and 2 and Comparative Application Examples 1 to 3 at various charge/discharge rates.

As shown in FIG. 6, a discharge specific capacity maintenance ratio at a discharge current of 10 C is calculated by dividing the discharge specific capacity at the first charge/discharge cycle at a discharge current of 10 C by the discharge specific capacity at the first charge/discharge cycle at a discharge current of 0.1. At a discharge current of 10 C, the discharge specific capacity maintenance ratios of the lithium-ion batteries of Application Examples 1 and 2 are respectively 74.2% and 74.6%, and the discharge specific capacity maintenance ratios of the lithium-ion batteries of Comparative Application Examples 1 to 3 are respectively 72.0%, 68.4%, and 71.7%, which are lower than those (74.2% and 74.6%) of the lithium-ion batteries of Application Examples 1 and 2.

The discharge specific capacity of each of the lithium-ion batteries of Application Examples 1 and 2 and Comparative Application Examples 1 to 3 was measured at 60° C. using the abovementioned battery test device at a current of 1 C/2 C and at a voltage ranging from 2.7 V to 4.25 V for 180 charge/discharge cycles. The results are shown in FIG. 7.

Figure 7:
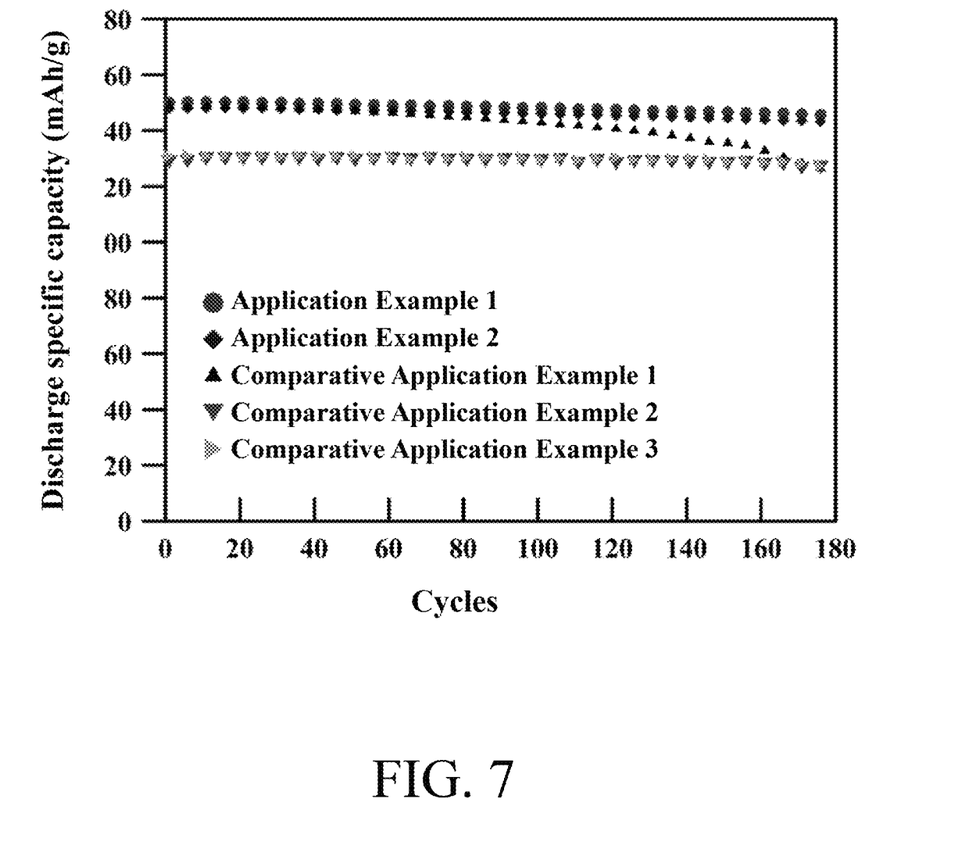
FIG. 7 is a graph illustrating cycle number-discharge specific capacity relationships of the lithium-ion batteries of Application Examples 1 and 2 and Comparative Application Examples 1 to 3 under a charge/discharge cycling test at an elevated temperature.

As shown in FIG. 7, the discharge specific capacity of each of the lithium-ion batteries of Application Examples 1 and 2 is larger than 140 mAhg, and does not decrease significantly even after 180 charge/discharge cycles at 60° C. Contrarily, the discharge specific capacity of the lithium-ion battery of Comparative Application Example 1 decreases significantly after 100 charge/discharge cycles. Although the discharge specific capacity of each of the the lithium-ion batteries of Comparative Application Examples 2 and 3 does not decrease significantly after 180 charge/discharge cycles at 60° C., it is smaller than 140 mAhg. Therefore, the lithium-ion batteries of Application Examples 1 and 2 have superior cycle life and discharge specific capacity at an elevated temperature.

In view of the aforesaid, the doped lithium manganese iron phosphate-based particulate of the disclosure contains a dopant having a gradient decreasing from a surface of the particulate towards a center of the particulate and has a relatively small amount of carbon, such that it has a relatively small specific surface area. The lithium-ion battery manufactured using the powdery material containing the doped lithium manganese iron phosphate-based particulates has a relatively large discharge specific capacity, a relatively high specific capacity maintenance ratio at a large discharge current, and a superior cycle life at an elevated temperature.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A doped lithium manganese iron phosphate-based particulate for a cathode of a lithium-ion battery, comprising a composition represented by Formula (1):

$$M_m\text{-}Li_xMn_{1-y-z}Fe_yM'_z(PO_4)_n/C \qquad (1)$$

wherein
M is selected from the group consisting of Mg, Ca, Sr, Al, Ti, Cr, Zn, W, and combinations thereof;
M' is selected from the group consisting of Mg, Ca, Sr, Al, Ti, Cr, Zn, W, and combinations thereof;
M is different from M';
$0.9 \leq x \leq 1.2$;
$0.1 \leq y \leq 0.4$;
$0 \leq z \leq 0.1$;
$0.11 \leq y+z \leq 0.4$;
$0.85 \leq n \leq 1.15$;
$0.0005 \leq m \leq 0.1$;
m has a gradient decreasing from a surface of said particulate towards a center of said particulate; and
C is in an amount of larger than 0 wt % and up to 3.0 wt % based on a total weight of a composition of $Li_xMn_{1-y-z}Fe_yM'_z(PO_4)_n/C$.

2. The doped lithium manganese iron phosphate-based particulate according to claim 1, wherein M is selected from the group consisting of Al, W, and a combination thereof.

3. The doped lithium manganese iron phosphate-based particulate according to claim 1, wherein M' is Mg.

4. The doped lithium manganese iron phosphate-based particulate according to claim 1, having a particulate size ranging from 0.5 μm to 20 μm.

5. A doped lithium manganese iron phosphate-based material for a cathode of a lithium-ion battery, comprising the doped lithium manganese iron phosphate-based particulate according to claim 1.

6. The doped lithium manganese iron phosphate-based material according to claim 5, having a specific surface area of smaller than 25.0 m²/g.

7. A method for preparing the doped lithium manganese iron phosphate-based material according to claim 5, comprising the steps of:
a) preparing a blend which includes a lithium source, a manganese source, an iron source, a phosphorous source, and a source of an additional metal selected from the group consisting of Mg, Ca, Sr, Al, Ti, Cr, Zn, W, and combinations thereof;
b) adding a carbon source to the blend to form a combination and subjecting the combination to milling and granulating to form a granulated combination;
c) subjecting the granulated combination to a preliminary sintering treatment to form a preform; and
d) mixing the preform with a source of a dopant selected from the group consisting of Mg, Ca, Sr, Al, Ti, Cr, Zn, W, and combinations thereof to obtain a mixture, and subjecting the mixture to a further sintering treatment to form the doped lithium manganese iron phosphate-based material;
wherein the dopant in step d) is different from the additional metal in step a), and a component of the dopant in step d) has a gradient decreasing from a surface of a particulate towards a center of said particulate.

8. The method according to claim 7, wherein the dopant in step d) is selected from the group consisting of Al, W, and a combination thereof.

9. The method according to claim 7, wherein the additional metal in step a) is Mg.

10. The method according to claim 7, wherein in step c), the preliminary sintering treatment is implemented at a temperature ranging from 400° C. to 850° C.

11. The method according to claim 7, wherein in step d), the further sintering treatment is implemented at a temperature ranging from 500° C. to 950° C.

* * * * *